Sept. 25, 1956  R. J. MOLYNEAUX  2,764,663
ELECTRIC HEATING APPARATUS
Filed July 13, 1955  3 Sheets-Sheet 1

INVENTOR.
Robert J. Molyneaux
BY
Smith, Olsen, Baird & Miller,
Attys.

Sept. 25, 1956  R. J. MOLYNEAUX  2,764,663
ELECTRIC HEATING APPARATUS
Filed July 13, 1955  3 Sheets-Sheet 2

FIG. 3

INVENTOR.
Robert J. Molyneaux.
BY
Smith, Olsen, Baird & Miller,
Attys.

Sept. 25, 1956  R. J. MOLYNEAUX  2,764,663
ELECTRIC HEATING APPARATUS
Filed July 13, 1955  3 Sheets-Sheet 3

INVENTOR.
Robert J. Molyneaux
BY
Smith, Olsen, Baird & Miller,
Attys.

United States Patent Office 2,764,663
Patented Sept. 25, 1956

2,764,663
ELECTRIC HEATING APPARATUS

Robert J. Molyneaux, Chicago, Ill., assignor to General Electric Company, a corporation of New York Application July 13, 1955, Serial No. 521,666

15 Claims. (Cl. 219—20)

The present invention relates to electric heating apparatus, and more particularly to improved switching and automatic temperature control systems for electric heating units or hotplates.

It is the general object of the present invention to provide in electric heating apparatus including an electric hotplate, a source of electric power, and equipment for automatically controlling the temperature of the hotplate, an improved manually operable control arrangement comprising a pushbutton switch selectively operative to establish any one of a plurality of fixed heating connections between the hotplate and the source independently of the automatic temperature control equipment and to establish a controlled heating connection between the hotplate and the source via the automatic temperature control equipment, and a pushbutton controller selectively operative to establish any one of a plurality of temperature control ranges for a vessel supported by the hotplate when the pushbutton switch occupies its position establishing the controlled heating connection mentioned.

Another object of the invention is to provide heating apparatus of the character described, and further comprising a rotary controller selectively operative to establish any one of a number of temperature control bands within any one of the established temperature control ranges for the supported vessel, whereby both coarse and fine temperature controls are readily established in a simple and direct manner in conjunction with an automatic temperature-controlled cooking operation.

A further object of the invention is to provide an automatic temperature control system for an electric hotplate that is especially designed for cooking purposes, that embodies an improved electric control circuit, whereby positive and accurate regulation of the temperature of a cooking vessel supported by the hotplate is achieved in a simple and direct manner.

A still further object of the invention is to provide in an automatic temperature control system of the character described, an improved electric control circuit incorporating an electron discharge tube and a circuit network for selectively controlling the tube, whereby both a manually preset desired temperature control and an automatically measured temperature control of a vessel supported by the hotplate are integrated in a circuit network and employed in the control of the tube.

Further features of the invention pertain to the particular arrangement of the elements of the electric heating apparatus and of the associated control network, whereby the above-outlined and additional operating features thereof are attained.

The invention, both as to its organization and method of operation, together with further objects and advantages thereof, will best be understood by reference to the following specification taken in connection with the accompanying drawings, in which.

Figure 1:
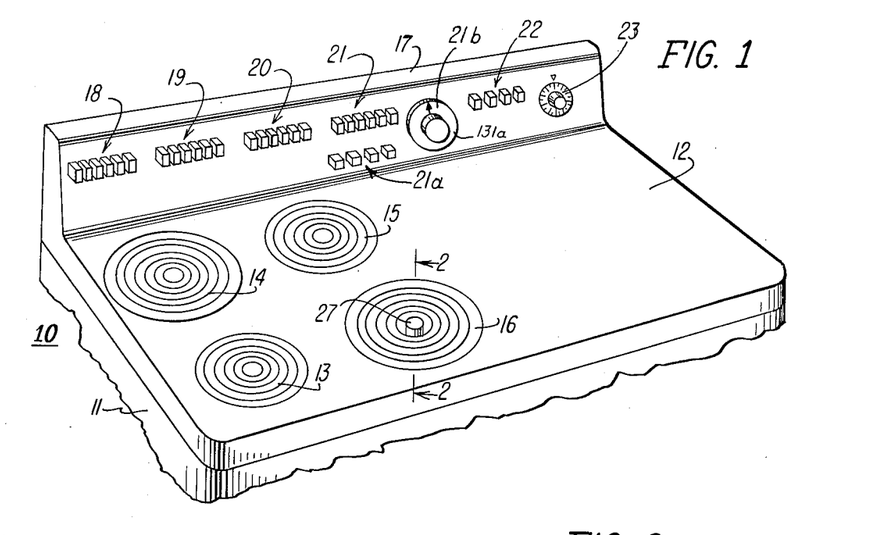
Figure 1 is a fragmentary front perspective view of the upper portion of an electric range incorporating electric heating apparatus embodying the present invention.

Referring now to Fig. 1 of the drawings, there is illustrated an electric range 10 incorporating electric heating apparatus embodying the features of the present invention and comprising an upstanding body 11 provided with a substantially horizontally disposed cooking top 12 supporting a plurality of surface heating units or hotplates 13, 14, 15 and 16 arranged in spaced-apart relation in a substantially rectangular pattern on the left-hand side thereof. The body 11 houses an oven, not shown, in the right-hand portion thereof, and a compartment, not shown, in the left-hand portion thereof, the oven and the compartment being provided with respective front doors, not shown. The cooking top 12 carries an upstanding backsplash 17 adjacent to the rear thereof that, in turn, carries a plurality of surface heating unit selector switches 18, 19 and 20, a special surface heating unit selector or control switch 21, a first pushbutton temperature controller 21A, a second rotary temperature controller 21B, an oven selector switch 22, and an oven regulator or thermostatic switch 23, the elements named being arranged generally in a row across the front of the backsplash 17. The selector switches 18, 19 and 20 respectively correspond to the surface heating units 13, 14 and 15, and are of conventional construction and are respectively included in the electric heating circuits thereof; while the special control switch 21 corresponds to the surface heating unit 16 of special construction and is included in the electric heating circuit thereof. Each of the surface heating unit selector switches 18, 19 and 20 is of the pushbutton type and is preferably of the construction of that disclosed in U. S. Patent No. 2,431,904, granted on December 2, 1947, to John L. Andrews; the special control switch 21 is of the pushbutton type and is of a modified form with respect to the construction disclosed in the Andrews patent mentioned, as explained more fully hereinafter; the pushbutton switch 22 is of the pushbutton type and is substantially of the construction disclosed in the Andrews patent. The pushbutton temperaure controller 21A is of the pushbutton type and is of a modified form with respect to the construction disclosed in the Andrews patent, as explained more fully hereinafter; the rotary controller 21B is essentially of standard rotary construction; and the thermostatic switch 23 is of conventional construction.

The cooking top 12 has a plurality of openings therein that respectively receive the surface heating units 13, etc.; and each of the surface heating units 13, 14 and 15 may be fundamentally of the construction disclosed in U. S. Patent No. 2,563,443, granted on August 21, 1951, to Oliver G. Vogel and Francis E. Kirk; while the surface heating unit 16 is of special construction described more fully below.

The surface heating unit 16 is of the hotplate type and is mounted for pivotal movements in the associated opening provided in the cooking top 12, by mechanism, not shown, that is preferably of the construction of that disclosed in U. S. Patent No. 2,565,432, granted on August 21, 1951, to Francis E. Kirk. More particularly, referring to Fig. 2, the heating unit 16 comprises a spider 24 carrying a heating element 25 including respective inner and outer sections 25a and 25b, only a portion of the inner section 25a being illustrated. The heating element 25 is generally in the form of a helical coil or spiral, the turns of which are arranged in radially spaced-apart relation; and preferably, the heating element 25 is of the metal sheath-helical resistance conductor type disclosed in U. S. Patent No. 1,367,341, granted on February 1, 1921, to Charles C. Abbott. The spider 24 comprises a substantially centrally disposed upstanding ring 26, the coils of the heating element 25 being selectively staked to the arms of the spider 24 in the general manner disclosed in the Vogel and Kirk patent mentioned. The top surfaces of the coils of the heating element 25 are flattened to define a substantially horizontal plane adapted to engage and support the bottom wall of a cooking vessel, or the like, not shown.

Figure 2:
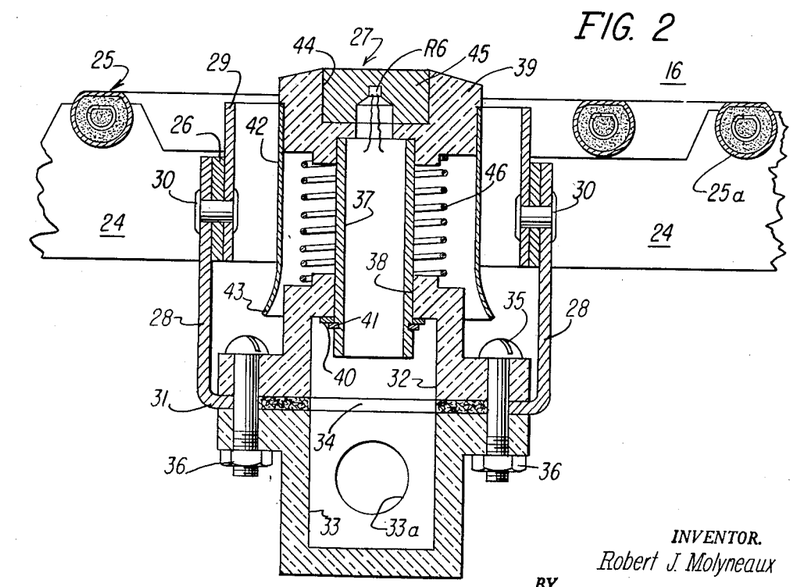
Fig. 2 is a greatly enlarged fragmentary vertical sectional view of one of the electric heating units or hotplates incorporated in the electric range, taken in the direction of the arrows along the line 2—2 in Fig. 1, illustrating the construction of the temperature sensing unit incorporated therein and forming a part of the electric control network.

The hotplate 16 carries a temperature-sensing unit 27 within the central ring 26 that is adapted to engage the bottom wall of the cooking vessel, or the like, supported upon the heating element 25; and more particularly, a pair of opposed depending arms 28 are arranged exteriorly of the central ring 26 and an upstanding tubular heat shield 29 is arranged interiorly of the central ring 26, the arms 28 and the heat shield 29 being retained in place by an opposed pair of rivets 30. The arms 28 terminate in inwardly directed flanges 31 disposed below the central ring 26 that carry upper and lower substantially cup-shaped insulating housings 32 and 33 formed of lava, or the like. The upper housing 32 is arranged in inverted position and constitutes a supporting base, the housings 32 and 33 being retained in place upon the flanges 31, with an asbestos ring 34 clamped therebetween, by removable screws 35 provided with cooperating nuts 36. An upstanding tubular member 37 is slidably mounted in a cooperating opening 38 provided in the top of the base 32, the upper end of the tubular member 37 carrying an insulating ring 39 formed of lava, or the like, and arranged within the heat baffle 29 in spaced relation with respect thereto. The tubular member 37 is retained in place by an arrangement including a surrounding washer 40 and a cooperating lock ring 41 carried on the lower end thereof and cooperating with the top of the base 32 adjacent to the opening 38. The ring 39, in turn, carries a depending tubular heat shield 42 of general skirt-like structure that is spaced inwardly with respect to the cooperating heat shield 29, the extreme lower end of the heat shield 42 being outwardly flared, as indicated at 43, so that it covers the top of the base 32. A central cavity 44 is formed in top of the ring 39 and carries a sensing button 45 formed of aluminum, or the like.

In the arrangement, the heat shields 29 and 42, as well as the tubular member 37, are preferably formed of stainless steel, or other bright and reflective material; while the sensing button 45 is formed of aluminum, or the like, as previously noted, so that it constitutes a good heat conductor capable of following closely the temperature of the bottom wall of a cooking vessel, or the like, supported by the heating element 25. The tubular member 37, the ring 39, the heat shield 42 and the sensing button 45 are movable as a unit with respect to the base 32 by virtue of the arrangement of a coil spring 46 surrounding the tubular member 37 and disposed between the top of the base 32 and the bottom of the ring 39. More particularly, the coil spring 46 normally biases the parts 37, 39, 42 and 45 upwardly with respect to the base 32; whereby the top surface of the sensing button 45 is normally disposed slightly above the substantially horizontal plane of the flattened top surface of the heating element 25. However, when a cooking vessel, or the like, is placed upon the heating element 25, the bottom wall thereof engages the top surface of the sensing button 45 moving the elements 37, 39, 42 and 45 downwardly with respect to the base 32 against the bias of the coil spring 46; whereby the top surface of the sensing button 45 is urged in good thermal contact with the bottom wall of the supported cooking vessel by the coil spring 46.

A temperature sensing resistor R6 is arranged in a cooperating centrally disposed cavity formed in the lower surface of the sensing button 45, the temperature sensing resistor R6 is, of course, movable with the sensing button 45 and is arranged in good heat exchange relation therewith, for a purpose more fully explained hereinafter, the temperature sensing resistor R6 being included in an external electric circuit, described more fully hereinafter, the connecting wiring elements extending through the tubular member 37 and through a hole 33a provided in the housing 33. Since the wiring mentioned is subject to a rather high temperature, it is preferably formed of silver, or the like, and is preferably covered with an insulating material capable of withstanding the relatively high temperature mentioned, such, for example, as polytetrafluoroethylene, sold as "Teflon." The sensing resistor R6 is formed of material having a high negative temperature coefficient of resistance, such, for example, as the material consisting of sintered aluminum oxide and an oxide of magnesium, manganese, titanium, iron, nickel, cobalt, zinc, etc., and known as "thermistor" material. For example, the thermistor R6 may have the exceedingly high temperature coefficient of resistance corresponding to a resistance rate change of: $-0.044$ ohm/ohm/° C.; whereby the characteristic of the thermistor R6 may be as follows:

| Temperature (° C.): | Total resistance (ohms) |
| --- | --- |
| 25 | 100,000 |
| 50 | 34,000 |
| 100 | 6,000 |
| 150 | 1,700 |
| 200 | 580 |

Figure 3:
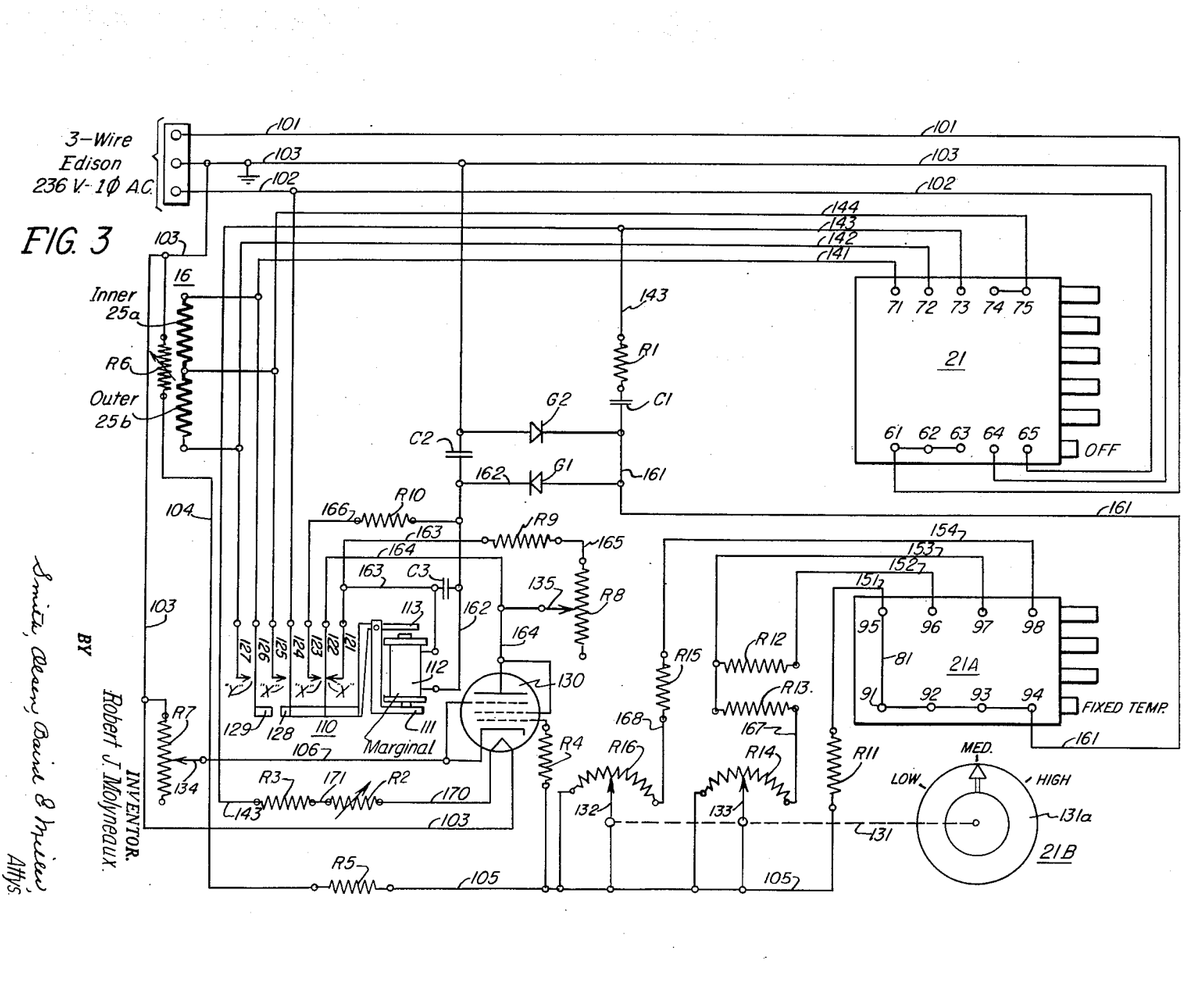
Fig. 3 is a diagram of the electric control circuit for the electric heating unit or hotplate and incorporating the temperature sensing unit, both shown in Fig. 2, as well as a manually operable control arrangement for the hotplate, the control arrangement including a pushbutton circuit control switch shown in its off position, a pushbutton temperature controller shown in its fixed heat position, and a rotary temperature controller shown in its medium position.

As indicated in Figs. 1 and 3 to 8, inclusive, the special control switch 21 is of the pushbutton type, as previously noted, and comprises a casing housed within the hollow backsplash 17 and carrying six individual pushbuttons projecting forwardly through appropriate holes formed in the front of the backsplash 17, the six individual pushbuttons mentioned being respectively designated: "High," "2nd," "3rd," "Low," "Auto" (abbreviation for automatic) and "Off," the six individual pushbuttons named being respectively arranged from left to right as illustrated in Fig. 1. Also, as indicated in Figs. 3 and 9 to 11, inclusive, the temperature controller 21A is of the pushbutton type, as previously noted, and comprises a casing housed within the hollow backsplash 17 and carrying four individual pushbuttons projecting forwardly through appropriate holes formed in the front of the backsplash 17, the four individual pushbuttons mentioned being respectively designated: "Fixed Temp," "Low Boil," "High Boil" and "Fry," the four individual pushbuttons named being respectively arranged from left to right as illustrated in Fig. 1. As indicated in Figs. 1 and 3, the temperature controller 21B is of the rotary type, as previously noted, and comprises a casing housed within the hollow backsplash 17 and carrying a rotary operating shaft 131 projecting forwardly through an appropriate hole formed in the front of the backsplash 17 and carrying a cooperating rotary dial 131a provided with a pointer cooperating with the legends: "Low," "Medium" and "High" provided on the front of the backsplash 17, as indicated in Fig. 3.

In the arrangement, the individual pushbuttons of the temperature controller 21A correspond to particular temperature ranges of a cooking vessel supported by the hotplate 16; whereby the fixed heat range may correspond to the temperature range 160° F.±5° F., the low boil range may correspond to the temperature range 215° F.—(0 to 15° F.), the high boil range may correspond to the temperature range 230° F.—(0 to 20° F.) and the fry range may correspond to the temperature range 425° F.—(0 to 195° F.). Also, in the arrangement, the individual positions of the rotary dial 121a of the temperature controller 21B correspond to particular temperature bands within any one of the low boil, high boil and fry temperature ranges of the pushbutton controller 21A. More particularly, when the pushbutton controller 21A occupies its low boil position, operation of the temperature controller 21B over its range may achieve the approximate 15° F. modification of the low boil range, as noted above; similarly, when the pushbutton controller 21A occupies its high boil position, operation of the temperature controller 21B over its range may achieve the approximate 20° F. modification of the high boil range, as noted above; and similarly, when the pushbutton controller 21A occupies its fry position, operation of the temperature controller 21B over its range may achieve the approximate 195° F. modification of the fry range, as noted above. Further, it is pointed out that the operation of the rotary controller 21B over its range is without effect when the pushbutton controller 21A occupies its fixed heat position. Generally, the fixed heat, the low boil, the high boil and the fry ranges of the pushbutton controller 21A respectively correspond to meat-cooking, low temperature candy-making, high temperature candy-making and deep-fat-frying cooking operations that may be carried out in the vessel supported by the hotplate 16.

Figure 4:
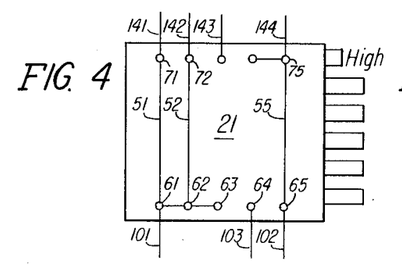
Figs. 4 to 8, inclusive, are diagrammatic illustrations of the pushbutton circuit control switch of Figs. 1 and 3, showing the respective high, 2nd, 3rd, low and automatic positions thereof.
Figure 5:
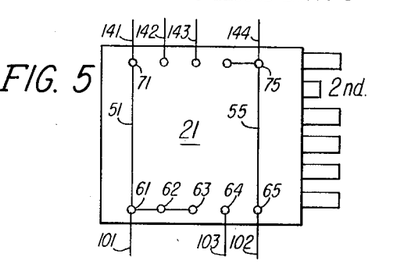
Figure 6:
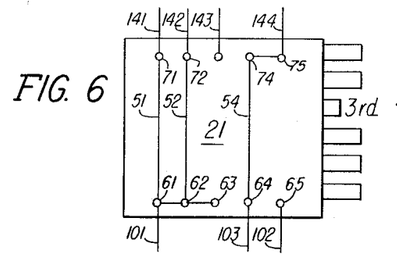
Figure 7:
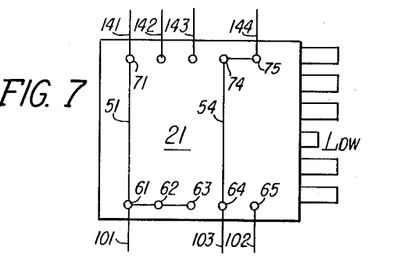
Figure 8:
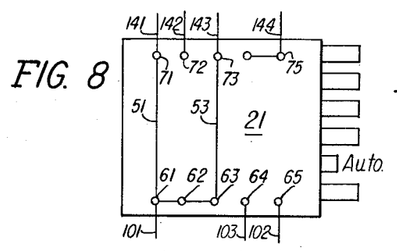

As previously noted, the manually operable push-button switch 21 is of the general construction and arrangement of that disclosed in the Andrews patent, but is appropriately modified to include the particular controls governed by the individual six pushbuttons thereof, as shown in Figs. 3 to 8, inclusive. Specifically, the casing of the pushbutton switch 21 houses five individual switch blades 51 to 55, inclusive, five individual incoming terminals 61 to 65, inclusive, five individual outgoing terminals 71 to 75, inclusive, and mechanism selectively governed by the six individual pushbuttons for selectively operating the five individual switch blades 51 to 55, inclusive. More specifically when the off pushbutton occupies its operated position, as shown in Fig. 3, the five incoming terminals 61 to 65, inclusive, are respectively disconnected with respect to the five outgoing terminals 71 to 75, inclusive; when the high pushbutton occupies its operated position, as shown in Fig. 4, the three individual incoming terminals 61, 62 and 65 are respectively connected by the three individual switch blades 51, 52 and 55 to the three individual outgoing terminals 71, 72 and 75; when the 2nd pushbutton occupies its operated position, as shown in Fig. 5, the two individual incoming terminals 61 and 65 are respectively connected by the two individual switch blades 51 and 55 to the two individual outgoing terminals 71 and 75; when the 3rd pushbutton occupies its operated position, as shown in Fig. 6, the three individual incoming terminals 61, 62 and 64 are respectively connected by the three individual switch blades 51, 52 and 54 to the three individual outgoing terminals 71, 72 and 74; when the low pushbutton occupies its operated position, as shown in Fig. 7, the two individual incoming terminals 61 and 64 are respectively connected by the two individual switch blades 51 and 54 to the two individual outgoing terminals 71 and 74; and when the automatic pushbutton occupies its operated position, as shown in Fig. 8, the two individual incoming terminals 61 and 63 are respectively connected by the two individual switch blades 51 and 53 to the two individual outgoing terminals 71 and 73. Also, the three individual incoming terminals 61, 62 and 63 are permanently strapped, and the two individual outgoing terminals 74 and 75 are permanently strapped. Further, the pushbutton switch 21 comprises interlock mechanism, not shown, of the character of that disclosed in the previously-mentioned Andrews patent so that the operation of any one of the six pushbuttons into its depressed position effects the return of the prior last-operated one of the pushbuttons into its projected position; whereby only one of the six individual pushbuttons may occupy its depressed or operated position at any time.

Figure 9:
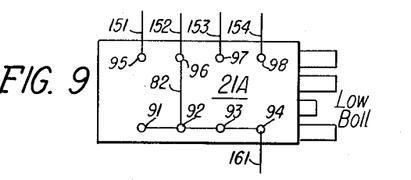
Figs. 9 to 11, inclusive, are diagrammatic illustrations of the pushbutton temperature controller of Figs. 1 and 3, showing the respective low boil, high boil and fry positions thereof.
Figure 10:
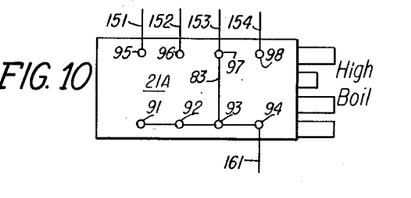
Figure 11:
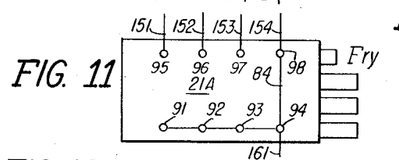

Also, as previously noted, the manually operable pushbutton controller 21A is of the general construction and arrangement of that disclosed in the previously-mentioned Andrews patent, but is modified to include the particular controls governed by the individual four pushbuttons thereof, as respectively shown in Figs. 3 and 9 to 11, inclusive. Specifically, the casing of the pushbutton controller 21A houses four individual switch blades 81 to 84, inclusive, four individual incoming terminals 91 to 94, inclusive, four individual outgoing terminals 95 to 98, inclusive, and mechanism selectively governed by the four individual pushbuttons for selectively operating the four individual switch blades 81 to 84, inclusive. More specifically, when the fixed heat pushbutton occupies its operated position, as shown in Fig. 3, the individual incoming terminal 91 is connected by the individual switch blade 81 to the individual outgoing terminal 95; when the low boil pushbutton occupies its operated position, as shown in Fig. 9, the individual incoming terminal 92 is connected by the individual switch blade 82 to the individual outgoing terminal 96; when the high boil pushbutton occupies its operated position, as shown in Fig. 10, the individual incoming terminal 93 is connected by the individual switch blade 83 to the individual outgoing terminal 97; and when the fry pushbutton occupies its operated position, as shown in Fig. 11, the individual incoming terminal 94 is connected by the individual switch blade 84 to the individual outgoing terminal 98. Also, the four individual incoming terminals 91, 92, 93 and 94 are permanently strapped. Further, the pushbutton controller 21A comprises interlock mechanism, not shown, of the character of that disclosed in the previously-mentioned Andrews patent, so that the operation of any one of the four pushbuttons into its depressed position effects the return of the prior last-operated one of the pushbuttons into its projected position; whereby only one of the four individual pushbuttons may occupy its depressed or operated position at any time.

As best shown in Fig. 3, the rotary controller 31B comprises, in addition to the rotary operating shaft 131 and the dial 131A, two wipers 132 and 133 respectively associated with two arcuately arranged resistors R16 and R14, thereby to provide two corresponding rheostats, the wipers 132 and 133 being carried by the rotary operating shaft 131 and simultaneously adjusted by rotation thereof with respect to the resistors R16 and R14, respectively.

The circuit network comprises, as shown in Fig. 3, a 3-wire Edison source of power supply of 230 volts, single-phase, A. C., provided with two outside lines 101 and 102 and a grounded neutral line 103. The incoming terminals 61, 64 and 65 of the pushbutton switch 21 respectively terminate the lines 101, 103 and 102, and the outgoing terminals 71, 72, 73 and 75 thereof respectively terminate four conductors 141, 142, 143 and 144. The incoming terminals 94 of the pushbutton controller 21A terminates a conductor 161, and the outgoing terminals 95, 96, 97 and 98 thereof respectively terminate four conductors 151, 152, 153 and 154.

The wipers 132 and 133 are commonly connected to a biasing conductor 105; and likewise the left-hand ends of the resistors R16 and R14 are commonly connected to the biasing conductor 105; while the right-hand ends of the resistors R16 and R14 are respectively connected to two conductors 168 and 167. Also, in the arrangement, a resistor R11 is connected between the biasing conductor 105 and the conductor 151, a resistor R12 is connected between the conductors 152 and 153, a resistor R13 is connected between the conductors 153 and 167, and a resistor R15 is connected between the conductors 154 and 168.

Also, the circuit network comprises an electromagnetic relay 110 of the marginal type provided with a field structure 111 carrying an operating winding 112 and provided with a pivotally mounted armature 113 that cooperates with a number of switch springs 121 to 127, inclusive. In the arrangement, the switch spring 122 commonly co-operates with the rear switch spring 121 and the front switch spring 123, while the movable switch springs 124 and 126 respectively cooperate with the front switch springs 125 and 127. Moreover, the movable switch springs 122 and 124 are operated by the armature 113 on an "X" basis, while the movable switch spring 126 is operated by the armature 113 on a "Y" basis. In other words, when the armature 113 is operated, the movable switch springs 122 and 124 complete their operating movements prior to the operating movement of the movable switch spring 126; whereas, when the armature 113 is restored, the movable switch spring 126 completes its restoring movement prior to the restoring movements of the movable switch springs 122 and 124; which arrangement is achieved by the construction of the associated insulating operators 128 and 129 operatively associated with the armature 113. In the arrangement, the switch springs 121, 122 and 123 respectively terminate three conductors 163, 164 and 166, the switch spring 124 terminates the line 102, and the switch springs 125, 126 and 127 respectively terminate the conductors 144, 141 and 142.

Further, the circuit network comprises two rectifiers G1 and G2, preferably of the selenium crystal type, a load resistor R1 and two capacitors C1 and C2, the load resistor R1 and the capacitor C1 being connected in series relation between the conductors 143 and 161, the rectifier G1 and the capacitor C2 being connected in series relation by a conductor 162 between the conductor 161 and the line 103, and the rectifier G2 being connected between the line 103 and the conductor 161. Thus, in the arrangement the rectifiers G1 and G2 are connected in the general manner of a voltage doubler, whereby a D. C. voltage of about 250-volts with respect to ground potential appears upon the conductor 162, and a D. C. voltage of about 150-volts with respect to ground potential appears upon the conductor 161, when the pushbutton switch 21 occupies its automatic position connecting the outside line 101 to the conductor 143, as explained more fully hereinafter. Thus, the conductor 161 constitutes a low voltage supply bus, and the conductor 162 constitutes a high voltage supply bus.

Also, the circuit network comprises an electron discharge device, or tube, 130 that is preferably of Type 6AQ5, a pentode including an anode, a suppressor grid, a screen grid, a control grid, and a coated cathode, the cathode being provided with an associated heater. In the tube 130, the anode and the screen grid are connected to the conductor 164, the suppressor grid and the cathode are connected to a conductor 106, the control grid is connected to a conductor 169, and the heater is connected across the line 103 and a conductor 170. The conductor 170 is connected via a grid current limiting resistor R4 to the biasing conductor 105; the conductor 164 is also connected to a wiper 135 operatively associated with an adjustable resistor R8, one end of the resistor R8 being open and the other end thereof being connected to a conductor 165. A resistor R9 is connected between the conductors 163 and 165; and a capacitor C3 is bridged across the conductors 162 and 163 and consequently across the winding 112 of the relay 110. The conductor 106 is connected to a wiper 134 operatively associated with an adjustable resistor R7, one end of the resistor R7 being open, the other end thereof being connected to the line 103. The conductor 170 is connected via a resistor R2 to a conductor 171; and a resistor R3 is connected between the conductors 143 and 171. The temperature sensing resistor R6 is connected between the line 103 and a conductor 104; and a resistor R5 is connected between the conductor 104 and the biasing conductor 105. In the arrangement, the resistor R2 also comprises a thermistor (of the general character of the thermistor R6) and is operatively associated with the tube 130 so that it is heated thereby, the thermistor R2 having an exceedingly high negative temperature coefficient of resistance, the resistance being variable in the approximate range 2 to 18 ohms over the normal operating temperature range of the tube 130.

The inner and outer sections 25a and 25b of the heating element 25 of the hotplate 16 are connected in series relation, as previously noted, one terminal of the inner section 25a being connected to the conductor 141, one terminal of the outer section 25b being connected to the conductor 142, and the common terminal between the sections 25a and 25b being connected to the conductor 144. In the arrangement, the temperature sensing resistor R6 is operatively associated with the heating unit 25, whereby the resistance thereof is dependent upon the temperature thereof, so that the bias applied to the biasing conductor 105 from the line 103 is dependent upon the resistance of the temperature sensing resistor R6 and consequently the temperature thereat. Also the bias that is applied to the biasing conductor 105 is dependent jointly upon the operated position of the pushbutton controller 21A and the operated position of the rotary controller 21B by virtue of the fact that the inclusion of the various resistors R11, R12, R13, R14, R15 and R16 between the low voltage supply bus 161 and the biasing conductor 105 is dependent upon the various combinations of positions of the controllers 21A and 21B, as explained more fully hereinafter.

In the circuit network, the characteristic values of certain of the elements may be as follows:

| | |
|---|---|
| R1 | 27 ohms. |
| R2 | 2 to 18 ohms. |
| R3 | 250 ohms. |
| R4 | 100K ohms. |
| R5 | 2700 ohms. |
| R6 | 400 to 100,000 ohms. |
| R7 | 0 to 2000 ohms. |
| R8 | 0 to 4000 ohms. |
| R9 | 8200 ohms. |
| R10 | 10K ohms. |
| R11 | 82K ohms. |
| R12 | 7200 ohms. |
| R13 | 47K ohms. |
| R14 | 0 to 10K ohms. |
| R15 | 20K ohms. |
| R16 | 0 to 20K ohms. |
| C1 | 40 microfarads. |
| C2 | 40 microfarads. |
| C3 | 50 microfarads. |

In the relay 110, the resistance of the winding 112 may be 5K ohms and the critical voltage may be about 140- volts D. C., the relay 110 picking up its armature 113 at a voltage slightly above the critical voltage and in response to the transversal of its winding 112 of a current of about 10 milliamperes D. C., and the relay 110 dropping out its armature 113 at a voltage slightly below the critical voltage and in response to the transversal of its winding 112 of a current of about 6 milliamperes D. C. Also, the selenium rectifiers G1 and G2 may be rated at 30-milliamperes D. C. and 60 cycles, 130-volts A. C.

Considering now the operation of the circuit network, when the pushbutton switch 21 occupies its normal off position, as illustrated in Fig. 3, the lines 101, 102 and 103 are disconnected from all of the conductors 141, 142, 143 and 144, deenergizing all of the elements of the circuit network, so that the relay 110 normally occupies its restored position bringing about the deenergization of the inner and outer sections 25a and 25b of the heating element 25; and of course the tube 130 is cut-off since no voltage appears upon the high voltage supply bus 162.

Now assuming that the cook wishes to carry out a cooking operation at high heat independently of temperature control by the thermistor R6, she merely operates the high pushbutton of the pushbutton switch 21 into its position shown in Fig. 4; whereby the outside line 101 is respectively connected by the switch blades 51 and 52 to the conductors 141 and 142 and the outside line 102 is connected by the switch blade 55 to the conductor 144. Accordingly, the inner and outer sections 25a and 25b of the heating unit 25 are connected in parallel relationship across the outside lines 101 and 102 of the 3-wire Edison source; whereby the hotplate 16 is heated at the high rate entirely independently of the temperature control arrangement.

Now assuming that the cook wishes to carry out a cooking operation at 2nd heat independently of temperature control by the thermistor R6, she merely operates the 2nd pushbutton of the pushbutton switch 21 into its position shown in Fig. 5; whereby the outside lines 101 and 102 are respectively connected by the switch blades 51 and 55 to the conductors 141 and 144. Accordingly, the inner section 25a of the heating unit 25 is connected across the outside lines 101 and 102 of the 3-wire Edison source; whereby the hotplate 16 is heated at the 2nd rate entirely independently of the temperature control arrangement.

Now assuming that the cook wishes to carry out a cooking operation at 3rd heat independently of temperature control by the thermistor R6, she merely operates the 3rd pushbutton of the pushbutton switch 21 into its position shown in Fig. 6; whereby the outside line 101 is respectively connected by the switch blades 51 and 52 to the conductors 141 and 142 and the neutral line 103 is connected by the switch blade 54 to the conductor 144. Accordingly, the inner and outer sections 25a and 25b of the heating unit 25 are connected in parallel relationship across the outside line 101 and the neutral line 103 of the 3-wire Edison source; whereby the hotplate 16 is heated at the 3rd rate entirely independently of the temperature control arrangement.

Now assuming that the cook wishes to carry out a cooking operation at low heat independently of temperature control by the thermistor R6, she merely operates the low pushbutton of the pushbutton switch 21 into its position shown in Fig. 7; whereby the outside line 101 and the neutral line 103 are respectively connected by the switch blades 51 and 54 to the conductors 141 and 144. Accordingly, the inner section 25a of the heating unit 25 is connected across the outside line 101 and the neutral line 103 of the 3-wire Edison source; whereby the hotplate 16 is heated at the low rate entirely independently of the temperature control arrangement.

Now assuming that the cook wishes to carry out an automatic temperature controlled cooking operation, she first operates the automatic pushbutton of the pushbutton switch 21 into its position shown in Fig. 8, and then operates one of the pushbuttons of the pushbutton controller 21A in order to establish the desired temperature range of the automatic cooking operation, and finally sets the rotary controller 21B in order to establish the desired temperature band within the established temperature range. In the present example, it may be assumed that the cook wishes to carry out the automatic cooking operation in the fixed heat position of the pushbutton controller 21A, as shown in Fig. 3; whereby it is not necessary to set the rotary controller 21B in this instance, since the fixed heat position of the pushbutton controller 21A is in by-passing relation to the rotary controller 21B. At this time, it may be assumed that the heating element 25 of the hotplate 16 is cool, and that the cook places the cooking vessel and its contents in its supported position on the top surface of the hotplate 16 so that the bottom wall of the cooking vessel engages the sensing button 45 and moves the sensing unit 27 into its depressed position in order that the sensing button 45 is in good thermal contact with the bottom of the cooking vessel.

Upon operation of the pushbutton switch 21 into its automatic position of Fig. 8, the outside line 101 is connected via the switch blades 52 and 53 to the conductors 141 and 143; whereby the application of the alternating potential to the conductor 143 brings about operation of the rectifiers G1 and G2 so that the voltage doubling circuit arrangement, also including the load resistor R1 and the capacitor C1 and C2, is rendered operative to establish the relatively low positive voltage of about 150 v. with respect to ground potential upon the low voltage supply bus 161 and to establish the relatively high positive voltage of about 250 v. with respect to ground potential upon the high voltage supply bus 162; whereby the busses 161 and 162 are prepared to supply direct current to the control elements of the circuit, as explained below. Also, the application of alternating potential upon the conductor 143 completes a circuit including the resistor R3, the conductor 171, the resistor R2, the conductor 170 and the line 103 for energizing the heater associated with the cathode of the tube 130; whereby the thermistor R2 is heated effecting further reduction of the resistance thereof and a consequent increase in the current supplied to the cathode heater, the thermistor R2 being operatively associated with the tube 130 in heat exchange relation therewith, and the resistor R3 serving as a heater current limiting resistor. Accordingly, the cathode of the tube 130 is heated and quickly becomes electron-emissive. The direct voltage applied to the low voltage supply bus 161 is connected via the switch blade 81 to the conductor 151 and thence via the resistor R11 to the biasing conductor 105 by virtue of the fact that the pushbutton controller 21A occupies its fixed heat position as shown in Fig. 3; whereby the circuit is further extended from the biasing conductor 105 via the resistor R5, the conductor 104 and the resistor R6 to the grounded neutral line 103. Accordingly, the low voltage of the low voltage supply bus 101 includes in series relation the setting resistor R11, the limiting resistor R5 and the thermistor R6; whereby a relatively low biasing potential is applied to the biasing conductor 105 and consequently via the grid current limiting resistor R4 and the conductor 169 to the control grid of the tube 130, since the thermistor R6 being cool has an exceedingly high resistance at this time. More particularly, the bias applied to the control grid with respect to the anode of the tube 130 may be about —3 v. so that the tube 130 is set for conduction.

Also, at this time, a circuit is complete from the high voltage supply bus 162 via the winding 112 of the relay 110, the conductor 163, the closed contacts between the switch springs 121 and 122 and the conductor 164 to the anode of the tube 130, and from the cathode of the tube 130 via the conductor 106, the wiper 134 and the resistor R7 to the grounded neutral line 103; whereby the tube 130 is rendered conductive effecting energization of the winding 112 and the consequent operation of the relay 110, the wiper 134 being appropriately adjusted, as a factory adjustment, in order to establish the proper value of the plate current limiting resistor R7. More particularly, the relay 110 effects actuation of its armature 113; whereby the movable switch spring 122 disengages the stationary switch spring 121 opening a normally closed short-circuit between the conductors 163 and 164 around the resistor R9 and the included portion of the auxiliary resistor R8, the wiper 135 having been adjusted, as a factory adjustment, with respect to the resistor R8. Accordingly, the auxiliary resistors R9 and R8 are inserted in series relation with the winding 112 between the high voltage supply bus 162 and the conductor 164 terminated by the anode of the tube 130, for a purpose more fully explained hereinafter. Also, the movable switch spring 122 engages the stationary switch spring 123 completing a path for connecting the auxiliary resistor R10 between the high voltage supply bus 162 and the conductor 164; whereby the auxiliary resistor R10 is connected in parallel relation with the winding 112 and the auxiliary resistors R9 and R8, for a purpose more fully explained hereinafter. Further, the movable switch spring 124 engages the stationary switch spring 125 completing a circuit for energizing the inner section 25a of the heating element 25 across the outside line 102 and the conductor 141 and consequently the outside line 101; and then the movable switch spring 126 engages the stationary switch spring 127 completing a circuit for energizing the outer section 25b of the heating element 25 across the outside line 102 and the conductor 141 and consequently the outside line 101. Thus, at this time the inner and outer sections 25a and 25b of the heating element 25 are energized in parallel relation across the outside lines 101 and 102 of the 3-wire Edison source effecting heating of the hotplate 16 at the high rate and the consequent heating of the supported cooking vessel and the resulting heating of the thermistor R6 arranged in good heat exchange relation with the bottom wall of the supported cooking vessel.

At this time, when the thermistor R6 is cool, the above-traced series bridge circuit including the thermistor R6, the current limiting resistor R5 and the setting resistor R11 has an exceedingly high composite resistance due to the exceedingly high resistance of the thermistor R6; whereby the small negative bias is applied to the control grid of the tube 130 from the biasing conductor 105, as explained above.

Initially the winding 112 of the relay 110 is energized directly between the high voltage supply bus 162 and the conductor 164 extending to the anode of the tube 130, thereby insuring a quick pickup or operation thereof; however, incident to operation of the relay R110 the auxiliary resistors R9 and R8 are inserted in series relation with the energizing circuit for the operating winding 112, so as to facilitate subsequently the restoration of the relay 110 in the event of a reduction in the voltage applied to the feed conductor 164. Moreover, incident to operation of the relay 110 the auxiliary resistor R10 was bridged between the high voltage supply line 162 and the feed conductor 164 in order to compensate the network for the effective change in the resistance of the circuit for energizing the winding 112 of the relay 110, as a consequence of the operation of the relay 110 from its restored position into its operated position. This compensation of the circuit network insures that the change of position of the relay 110 from its restored position into its operated position imposes no different ultimate load upon the feed conductor 164 and consequently upon the tube 130 and the load resistor R1, at this time; whereby the load current traversing the tube 130 and the load resistor R1 is subsequently the same when the relay 110 occupies either its restored position or its operated position. In order to insure this result, the equivalent resistance between the high voltage supply bus 162 and the feed conductor 164 should be the same when the relay 110 occupies its respective restored and operated position; whereby;

$$R \text{ equivalent} = R_{112} = \frac{R_{10}(R_{112} + R_9 + R_8)}{R_{112} + R_{10} + R_9 + R_8}$$

wherein:
$R_{112}$ = resistance of the winding 112
$R_{10}$ = resistance of the resistor R10
$R_9$ = resistance of the resistor R9
$R_8$ = resistance of the resistor R8

As the temperature of the heating element 25 rises, with the passage of time, the temperature of the cooking vessel and its contents rises; whereby the sensing button 45 is heated through the bottom wall of the cooking vessel to raise the temperature thereof so as to bring about an increase in the temperature of the thermistor R6; whereby the resistance of the thermistor R6 is decreased effecting a corresponding decrease in the composite resistance of the series bridge circuit, with the result that the bias is increased upon the biasing conductor 105 and consequently an increased bias is applied to the control grid with respect to the cathode of the tube 130, with the result that the anode-cathode impedance of the tube 130 is increased bringing about a reduction of the potential applied to the feed conductor 164 and the consequent reduction in the voltage impressed across the winding 112 of the relay 110, and also of the voltage impressed across the capacitor C3 bridging the winding 112. The reduction of the voltage impressed across the winding 112 reduces the current traversing the same thereby tending to bring about the restoration of the relay 110 since it is of the marginal type. As the temperature of the cooking vessel is further increased, the above-described phenomena are accentuated, whereby ultimately the resistance of the thermistor R6 is reduced sufficiently that the bias applied to the biasing conductor 105 is increased to a value of about −3.5 v. that is adequate to bring about an increase in the anode-cathode impedance of the tube 130 to such extremity that the voltage applied to the feed conductor 164 is inadequate to retain operated the relay 110, so that the relay 110 restores.

More particularly, the armature 113 of the relay 110 is returned from its operated position back into its restored position so that the movable switch spring 126 first disengages the stationary switch 127 interrupting the circuit for energizing the outer section 25b of the heating element 25; and thereafter the movable switch springs 122 and 124 respectively disengage the stationary switch springs 123 and 125, the movable switch spring 122 re-engaging the stationary switch spring 121. The disengagement of the switch springs 124 and 125 interrupts the circuit for energizing the inner section 25a of the heating element 25; the disengagement of the switch springs 122 and 123 interrupts the path for connecting the auxiliary resistors R9 and R8 between the high voltage supply bus and the feed conductor 164; and the re-engagement of the switch springs 122 and 121 again short-circuits the auxiliary resistors R9 and R8, recompleting the original direct circuit for energizing the winding 112 between the high voltage supply bus 162 and the feed conductor 164.

At this time, it may be assumed that the voltage applied to the feed conductor 164 as a consequence of the present impedance of the tube 130 is adequate to reoperate the relay 110, although the removal of the auxiliary resistors R9 and R8 from the circuit for energizing the winding 112 facilitates reoperation of the relay 110. Again it is noted that the interruption of the circuit for connecting the auxiliary resistor R10 across the high voltage supply bus 162 and the feed conductor 164, together with the interruption of the series circuit for energizing the winding 112 through the auxiliary resistors R9 and R8, along with the recompletion of the direct circuit for energizing the winding 112 between the high voltage supply bus 162 and the feed conductor 164, does not change the effective resistance of the network due to the substantially constant equivalent resistance thereof, as explained above, when the relay 110 occupies either its operated position or its restored position; whereby the change of position of the relay 110 does not, in any way, affect the control of the series bridge circuit, including the thermistor R6, that is governed by the temperature of the bottom wall of the cooking vessel supported by the heating element 25.

Subsequently, the temperature of the heating element 25 subsides effecting a reduction in the temperature of the cooking vessel and its contents, so that the temperature of the thermistor R6 is reduced bringing about an increase in the resistance thereof with a consequent decrease in the current traversing the series bridge circuit, whereby the voltage applied to the biasing conductor 105 is reduced with the result that the impedance of the tube 130 is reduced, whereby the voltage applied to the feed conductor 164 is increased bringing about an increase in the voltage impressed across the winding 112 of the relay 110. As the temperature of the cooking vessel is further reduced, the above-described phenomena are accentuated; whereby the voltage ultimately appearing upon the feed conductor 164 is sufficient to effect reoperation of the relay 110 from its restored position back into its operated position.

In view of the foregoing description, it will be understood that the relay 110 is alternately operated and restored to effect connection and disconnection of the heating element 25 with respect to the outside lines 101 and 102 of the Edison source so as to maintain the previously-set temperature of the cooking vessel that is supported by the heating element 25. In this connection, it will be understood that the composite resistance of the series bridge circuit is controlled jointly by the resistance of the thermistor R6 and by the resistance of the control resistor R11, whereby the setting of the push-button controller 21A in its fixed heat position of Fig. 3 selects the control resistor R11 and consequently selects the resistance of the network between the low voltage supply bus 101 and the biasing conductor 105, thereby selectively setting the temperature that is to be maintained by the circuit network. In the present example, it has been assumed that the resistance of the control resistor R11 is such that the control network maintains the temperature of the supported vessel at a temperature in the approximate range 160°F.±5°F.

In conjunction with the operation and restoration of the relay 110 the action of the capacitor C3 is particularly noted. When the relay 110 occupies its restored position, the full voltage between the high voltage supply bus 162 and the feed conductor 164 is applied in parallel relation to the winding 112 and to the capacitor C3; whereas, when the relay 110 occupies its operated position, the auxiliary resistors R9 and R8 are inserted in series relation with the winding 112 and consequently in series relation with the capacitor C3. Thus, the voltage applied across the capacitor C3 is higher prior to operation of the relay 110 than it is subsequent to the operation of the relay 110; whereby the capacitor C3 is at least partially discharged through the winding 112 incident to operation of the relay 110. This action insures that the relay 110 remains in its operated position at least during this discharge time interval of the capacitor C3, which time interval is substantially fixed by virtue of the fixed capacitance of the capacitor C3 and the fixed resistance of the winding 112. Conversely when the relay 110 is actuated from its operated position into its restored position, the capacitor C3 is charged to a higher voltage as a result of the removal of the auxiliary resistors R9 and R8 from the charging circuit thereof. This action insures that the relay 110 remains in its restored position during this charging time interval; and this charging time interval is established primarily by the anode-cathode impedance of the tube 130; that, in turn, is established at this time by the resistance of the selected resistor R11, assuming that the thermistor R6 has a temperature substantially at the preset temperature. Finally, the selection of the resistor R11 for the control purpose is based upon the operated position of the fixed heat pushbutton of the pushbutton controller 21A, whereby the fixed temperature of about 160°F.±5°F. is, in fact, established by the operation of the fixed heat pushbutton of the pushbutton controller 21A. Thus this arrangement of the capacitor C3 in the circuit network, as described above, not only prevents rapid hunting or fluttering of the relay 110 between its operated and restored position when the critical voltage is applied upon the feed conductor 164, but the arrangement positively insures that the ratio of the operated time interval and the restored time interval of the relay 110 is, in fact, established by the operated position of the pushbutton controller 21A. Specifically, this ratio is established by virtue of the fact that the operated time interval of the relay 110 is substantially fixed, whereas the restored time interval of the relay 110 is variably dependent upon the anode-cathode impedance of the tube 130 when the hotplate 16 is substantially at the preset control temperature, which time interval is preset by the pushbutton controller 21A, as explained above.

Considering now the carrying out of an automatic temperature controlled cooking operation involving other cooking temperature ranges, it may be assumed the low boil temperature range is involved, whereby subsequent to operation of the pushbutton switch 21 into its automatic position of Fig. 8, the low boil pushbutton of the pushbutton controller 21A is operated, as shown in Fig. 9. The operation of the pushbutton controller 21A into its low boil position, as shown in Fig. 9, brings about the connection of the conductor 161 to the conductor 152 via the switch blade 82, whereby the resistors R12, R13 and R14 are interposed with respect to the low voltage supply bus 161 and the biasing conductor 105. The maximum and minimum resistances of this network are 64,200 ohms and 54,200 ohms (depending upon the setting of the rotary controller 21B that will be neglected at this time), when the pushbutton controller 21A occupies its low boil position, as contrasted with a resistance of 82,000 ohms (the resistor R11) when the rotary controller 21A occupies its fixed heat position. Thus, in the low boil position of the pushbutton controller 21A there is effected a reduction in the initial biasing voltage impressed upon the biasing conductor 105 that not only renders the tube 130 conductive, but requires a further reduction in the resistance of the thermistor R6, and consequently a higher temperature thereof, before the biasing voltage applied to the biasing conductor 105 can reach a value sufficiently high to bring about the application of a bias to the control grid of the tube 130 such as to increase the anode-cathode impedance thereof to a value sufficiently high to bring about the required reduction of the voltage applied to the feed conductor 164 to effect the restoration of the relay 110. Accordingly, the circuit network is effective to maintain a higher temperature of the hotplate 16 when the pushbutton controller 21A occupies its low boil position than is maintained when the pushbutton controller 21A occupies its fixed heat position.

As noted above, when the pushbutton controller 21A occupies its low boil position, the resistance network interposed with respect to the low voltage supply bus 161 and the biasing conductor 105 includes the variable resistor R14 that may be selectively cut-out or cut-in this network, thereby varying the actual resistance between the maximum resistance of 64,200 ohms and the minimum resistance of 54,200 ohms, as previously noted. This selective inclusion or variable setting of the resistor R14 is effected by the position of the associated wiper 133 that is governed by the adjusted position of the manual dial 131a of the rotary controller 21B, thereby selectively to set a temperature band within the previously set temperature range. Specifically, as the manual dial 131a of the rotary controller 21B is rotated in the clockwise direction, as viewed in Fig. 3, from its low position toward its high position, the resistor R14 is progressively excluded from the resistance network thereby reducing the resistance thereof and setting a higher temperature band to be maintained within the temperature range established by the low boil position of the pushbutton controller 21A. This variation of the resistor R14 over the operating range of the rotary controller 21B may effect a modification of about 15° F. in the established temperature range of the pushbutton controller 21A in its low boil position.

In carrying out an automatic temperature controlled cooking operation involving the high boil temperature range, the high boil pushbutton of the pushbutton controller 21A is operated to establish this temperature range and the rotary controller 21B is set to establish the desired band within this range. In this case, the pushbutton controller 21A occupies its position illustrated in Fig. 10, whereby the switch blade 83 connects the low voltage supply bus 161 to the conductor 153, whereby connection to the biasing conductor 105 includes only the resistor R13 and the resistor R14; which connection has maximum and minimum resistances of 57,000 ohms and 47,000 ohms respectively; whereby the temperature that is maintained by the control circuit is higher than that maintained in the low boil range for the reasons previously explained, the operations of the control circuit being in nowise fundamentally different from those previously described. In this instance, the adjustment of the rotary controller 21B may effect a temperature modification of about 20° F. in the established high boil temperature range.

In carrying out an automatic temperature controlled cooking operation involving the fry temperature range, the fry pushbutton of the pushbutton controller 21A is operated to establish this temperature range and the rotary controller 21B is set to establish the desired band within this range. In this connection, the pushbutton controller 21A occupies its position illustrated in Fig. 11, whereby the switch blade 84 connects the low voltage supply bus 161 to the conductor 154, whereby the connection to the biasing conductor 105 includes the fixed resistor R15 and a portion of the variable resistor R16 that may be variably set by the associated wiper 132 depending upon the adjustment of the rotary controller 21B; which connection has maximum and minimum resistances of 40,000 and 20,000 ohms, respectively; whereby the temperature that is maintained by the control circuit is still higher than that maintained in the high boil range for the reasons previously explained, the operation of the control circuit being in nowise fundamentally different from those previously described. In this instance, the adjustment of the rotary controller 21B may effect temperature modification of about 195° F. in the established fry temperature range. This wide variation of the temperature range results from the circumstance that the resistance of the variable resistor R16 is equal to that of the fixed resistor R15; whereby substantially all of the bias is removed from the biasing conductor 105 when the rotary controller 21B occupies its high position with the pushbutton controller 21A in its fry position so that the temperature of the thermistor R6 must be very high (about 425° F.) in order to obtain a resistance thereof sufficiently low to cause a sufficient bias upon the biasing conductor 105 to bring about the control of the tube 130 to reduce the voltage upon the feed conductor 164 to the critical voltage for the purpose of effecting the restoration of the relay 110, in the manner previously explained.

Figures 12, 13:
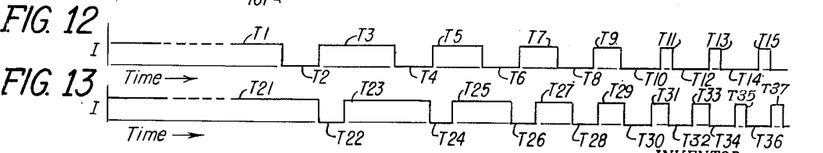
Fig. 12 is a diagrammatic operating chart of the automatic temperature control circuit of Fig. 3, when the pushbutton circuit control switch occupies its automatic position, the pushbutton temperature controller occupies its fry position, and the rotary temperature controller occupies its low position.
Fig. 13 is a diagrammatic operating chart, similar to Fig. 12, of the automatic temperature control circuit of Fig. 3, when the pushbutton circuit control switch occupies its automatic position, the pushbutton temperature controller occupies its fry position, and the rotary temperature controller occupies its high position.

The effects that are produced in the control circuit by the adjustment of the rotary controller 21B will be best understood from a comparison of the operating curves or charts of the automatic temperature control circuit when the rotary controller 21B respectively occupies its low and high positions with the pushbutton controller 21A in its fry position. More particularly, when the pushbutton controller 21A occupies its fry position and the rotary controller 21B occupies its low position, the supply of current to the hotplate 16 under the control of the relay 110 may be as indicated in Fig. 12. Specifically, assuming that the heating unit 25 is cool and that the pushbutton switch 21 is operated into its automatic position of Fig. 8, together with operation of the pushbutton controller 21A into its fry position of Fig. 11, and operation of the rotary controller 21B into its low position of Fig. 3, the relay 110 is operated and maintained operated for a considerable time interval T1 by virtue of the fact that the heating element 25 is cool and a considerable time interval must expire before the resistance of the thermistor R6 is reduced sufficiently to increase the bias upon the biasing conductor 105 to effect the first restoration of the relay 110. However, at the expiration of the time interval T1, the relay 110 restores and remains restored during the time interval T2; whereupon the relay 110 reoperates. Since the heating unit 25 is hot at this time the time interval T3 that may be required for the energization of the heating unit 25 so that the relay 110 is again restored in considerably shorter than the initial time interval T1; whereby the tube 130 causes cycling of the relay 110 and consequent alternate energization and deenergization of the heating unit 25 and the consequent elevation of the temperature thereof toward the preset low band in the fry range, the successive time intervals of operation of the relay 110 being indicated at T1, T3, T5, etc., and the successive time intervals of restoration of the relay 110 being indicated at T2, T4, T6, etc. Ultimately, the control circuit reaches a steady-state operating condition, whereby the operated time intervals T13, T15, etc., of the relay 110 become substantially constant and bear a predetermined ratio with respect to the restored time intervals T12, T14, etc., the restored time intervals having been established by the selective setting of the pushbutton controller 21A and the rotary controller 21B. Now since the operated time intervals T13, T15, etc., bear a predetermined relationship with respect to the restored time intervals T12, T14, etc., the steady-state condition of the power supplied to the hotplate 16 is thus established, thereby establishing the average temperature of the vessel supported thereby.

Turning now to the case when the pushbutton controller 21A occupies its fry position and the rotary controller 21B occupies its high position, the supply of current to the hotplate 16 under the control of the relay 110 may be as indicated in Fig. 13. Specifically, assuming that the heating unit 25 is cool and that the pushbutton switch 21 is operated into its automatic position of Fig. 8, together with operation of the pushbutton controller 21A into its fry position of Fig. 11, and operation of the rotary controller 21B into its high position of Fig. 3, the relay 110 is operated and maintained operated for a considerable time interval T21 by virtue of the fact that the heating element 25 is cool and a considerable time interval must expire before the resistance of the thermistor R6 is reduced sufficiently to increase the bias upon the biasing conductor 105 to effect the first restoration of the relay 110. However, at the expiration of the time interval T21, the relay 110 restores and remains restored during the time interval T22; whereupon the relay 110 reoperates. Since the heating unit 25 is hot at this time, the time interval T23 that may be required for the energization of the heating unit 25 so that the relay 110 is again restored is considerably shorter than the initial time interval T21; whereby the tube 130 causes cycling of the relay 110 and the consequent alternate energization and deenergization of the heating unit 25 and the consequent elevation of the temperature thereof toward the preset high band in the fry range, the successive time intervals of operation of the relay 110 being indicated at T21, T23, T25, etc., and the successive time intervals of restoration of the relay 110 being indicated at T22, T24, T26, etc. Ultimately, the control circuit reaches a steady-state operating condition, whereby the operated time intervals T35, T37, etc., of the relay 110 become substantially constant and bear a predetermined ratio with respect to the restored time intervals T34, T36, etc., the restored time intervals having been established by the selective settings of the pushbutton controller 21A and the rotary controller 21B. Now since the operated time intervals T35, T37, etc., bear a predetermined relationship with respect to the restored time intervals T34, T36, etc., at the steady-state condition, the power applied to the hotplate 16 is thus established, thereby establishing the average temperature of the vessel supported thereby.

Comparing the curves of Figs. 12 and 13, it will be appreciated that the respective initial time intervals T1, T3, etc., are somewhat shorter than the corresponding respective time intervals T21, T23, etc., by virtue of the fact that the low band, as contrasted with the high band, is set by the rotary controller 21B in the fry temperature range set by the pushbutton controller 21A with the pushbutton switch 21 in its automatic position. At the steady-state condition, the time intervals T13, T15, etc., are substantially equal to the time intervals T35, T37, etc., by virtue of the fact that the operated time intervals are established fundamentally by the discharge time interval of the capacitor C3 through the winding 112 of the relay 110. On the other hand, the time intervals T12, T14, etc., are longer than the time intervals T35, T36, etc., by virtue of the fact that the inclusion of additional resistance of the resistor R16 by the high band setting of the rotary controller 21B causes a higher initial bias upon the biasing conductor 105 with the result that the anode-cathode impedance of the tube 130 is higher during the charging time interval of the capacitor C3 with the result that the charging time interval is longer thereby maintaining the relay 110 in its restored position the longer time intervals T12, T14, etc., as contrasted with the shorter time intervals T34, T36, etc., when the rotary controller 21B occupies its high band position. In view of the foregoing, it will be understood that the ratio between the operated time intervals and the restored time intervals of the relay 110 is fundamentally established by the settings of the pushbutton controller 21A and the rotary controller 21B, thereby establishing the consequent ultimate temperature to be maintained at the bottom wall of the supported vessel; whereas the thermistor R6 functions fundamentally to indicate to the control circuit when the temperature of the bottom wall of the supported vessel is approximately at the desired and preset temperature.

The arrangement of the circuit network of Fig. 3 is very advantageous as it will be appreciated that there is, under no operating condition, any substantial current in the bridge circuit including the thermistor R6 and the limiting resistor R5 and the various resistors R11, etc., of the resistance network, thereby eliminating any self-heating of the thermistor R6, so that the temperature thereof is derived substantially entirely from the heating effects originating in the hotplate 16 so that the accuracy of the control network is substantially improved with respect to prior arrangements. Moreover, the provision of the thermistor R2 in the heater circuit for the cathode of the tube 130, together with the limiting resistor R3, is very advantageous as it maintains at a proper value the heater current and the consequent emission from the cathode of the tube 130.

In view of the foregoing, it will be understood that the pushbutton circuit selector switch 21 is operative into its high, 2nd, 3rd, and low positions to establish heating connections between the 3-wire Edison source and the hotplate 16 entirely independently of the temperature control arrangement; and moreover, the pushbutton switch 21 is operative into its off position to interrupt each of the heating connections mentioned, as well as to prevent the supply of power to the push-button controller 21A, so as positively to insure the complete de-energization of the hotplate 16, as well as the automatic temperature control arrangement. However, in the automatic position of the pushbutton switch 21 power is supplied to the pushbutton controller 21A that always occupies one of its four positions, thereby rendering immediate operative the automatic temperature control arrangement and the consequent governing of the temperature of the cooking vessel supported by the hotplate 16. More particularly, the pushbutton controller 21A always occupies one of its four temperature-selecting positions, as respectively shown in Figs. 3, 9, 10 and 11, whereby the corresponding one of the four temperature ranges is always preselected. Further, it will be understood that in the automatic temperature controlled operation, the operation of the fixed heat pushbutton of the pushbutton controller 21A excludes the rotary controller 21B from the resistance network, thereby disabling the same, and establishing the corresponding fixed temperature range entirely by the fixed heat position of the pushbutton controller 21A. On the other hand, in the automatic temperature controlled operation, the operation of the low boil, high boil and fry pushbuttons of the pushbutton controller 21A include the rotary controller 21B in the resistance network, thereby enabling the same, and establishing the corresponding one of the three temperature ranges, together with the established temperature band therein, as determined by the setting of the rotary controller 21B.

Accordingly, it is apparent that there has been provided in heating apparatus of the hotplate type, an improved circuit network for selectively establishing heating rates independently of temperature and for selectively establishing a wide range of predetermined temperatures, as well as desired bands within any one of the established temperature ranges, wherein the circuit network integrates the required controls derived both from the manually settable facility and from the hotplate, so as to bring about the required control of an associated electron discharge device and the consequent control of a power switch for the purpose of effecting selective connection and disconnection of the hotplate with respect to the power source.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In electric heating apparatus including an electric hotplate adapted to support a vessel to be heated, a source of electric power, and a power switch operative between an open position disconnecting said hotplate from said source and a closed position connecting said hotplate to said source: the combination comprising a unitary manually operable control switch having a plurality of heat-setting positions and an off position and an automatic temperature control position, said control switch being selectively operative into its plurality of different heat-setting positions to complete a corresponding plurality of different direct electrical heating connections independently of said power switch between said hotplate and said source so as to effect heating of said hotplate at a corresponding plurality of different heating rates, said control switch being operative into its off position to interrupt each of said heating connections and positively to insure operation of said power switch into its open position; and automatic temperature control equipment comprising a control circuit, means responsive to operation of said control switch into its automatic temperature control position for preparing said control circuit, means including a temperature sensing element operatively associated with a vessel supported by said hotplate for selectively governing said prepared control circuit, means controlled by said selective governing of said control circuit for selectively operating said power switch between its open and closed positions so as selectively to control heating of said hotplate, a selectively settable control device for selectively setting the range of response of said control circuit so as correspondingly to set the desired temperature range of the vessel supported by said hotplate and operatively associated with said temperature sensing element, a pushbutton controller operatively associated with said control switch and including a plurality of individual pushbuttons respectively corresponding to a plurality of temperature ranges and interlock means response to operation of any one of the pushbuttons out of its normal position for returning into its normal position the prior last-operated one of the pushbuttons, and means responsive to selective operation of the pushbuttons of said pushbutton controller for correspondingly selectively setting said control device.

2. The electric heating apparatus combination set forth in claim 1, wherein said control switch is in the form of a pushbutton switch including a plurality of individual pushbuttons respectively corresponding to its plurality of positions, and interlock means responsive to operation of any one of the pushbuttons out of its normal position for returning into its normal position the prior last-operated one of the pushbuttons.

3. In electric heating apparatus including an electric hotplate adapted to support a vessel to be heated, a source of electric power, and a power switch operative between an open position disconnecting said hotplate from said source and a closed position connecting said hotplate to said source: the combination comprising a unitary manually operable control switch having a plurality of heat-setting positions and an off position and an automatic temperature control position, said control switch being selectively operative into its plurality of different heat-setting positions to complete a corresponding plurality of different direct electrical heating connections independently of said power switch between said hotplate and said source so as to effect heating of said hotplate at a corresponding plurality of different heating rates, said control switch being operative into its off position to interrupt each of said heating connections and positively to insure operation of said power switch into its open position; and automatic temperature control equipment comprising a control circuit, means responsive to operation of said control switch into its automatic temperature control position for preparing said control circuit, means including a temperature sensing element operatively associated with a vessel supported by said hotplate for selectively governing said prepared control circuit, means controlled by said selective governing of said control circuit for selectively operating said power switch between its open and closed positions so as selectively to control heating of said hotplate, a selectively settable resistance network for selectively setting the range of response of said control circuit so as correspondingly to set the desired temperature of the vessel supported by said hotplate and operatively associated with said temperature sensing element, and a pushbutton switch operatively associated with said control switch and including a plurality of individual pushbuttons respectively corresponding to a plurality of temperature ranges and interlock means responsive to operation of any one of the pushbuttons out of its normal position for returning into its normal position the prior last-operated one of the pushbuttons, selective operation of the pushbuttons of said pushbutton switch correspondingly selectively setting said resistance network.

4. In electric heating apparatus including an electric hotplate adapted to support a vessel to be heated, a source of electric power, and a power switch operative between an open position disconnecting said hotplate from said source and a closed position connecting said hotplate to said source: the combination comprising a unitary manually operable control switch having a plurality of heat-setting positions and an off position and an automatic temperature control position, said control switch being selectively operative into its plurality of different heat-setting positions to complete a corresponding plurality of different direct electrical heating connections independently of said power switch between said hotplate and said source so as to effect heating of said hotplate at a corresponding plurality of different heating rates, said control switch being operative into its off position to interrupt each of said heating connections and positively to insure operation of said power switch into its open position; and automatic temperature control equipment comprising a control circuit, means responsive to operation of said control switch into its automatic temperature control position for preparing said control circuit, means including a temperature sensing element operatively associated with a vessel supported by said hotplate for selectively governing said prepared control circuit, means controlled by said selective governing of said control circuit for selectively operating said power switch between its open and closed positions so as selectively to control heating of said hotplate, a selectively settable control device for selectively setting the range of response of said control circuit so as correspondingly to set the desired temperature range of the vessel supported by said hotplate and operatively associated with said temperature sensing element, first and second manually operable controllers operatively associated with said control switch, means responsive to selective operation of said first controller for correspondingly selectively establishing a coarse setting of said control device and consequently a coarse desired temperature range of the supported vessel, and means responsive to selective operation of said second controller for correspondingly selectively establishing a fine setting of said control device and consequently a fine desired temperature band within any established coarse desired temperature range of the supported vessel.

5. The electric heating apparatus combination set forth in claim 4, wherein said first controller is essentially in the form of a pushbutton controller having a plurality of individual pushbutton respectively corresponding to a plurality of different coarse temperature ranges, and said second controller is essentially in the form of a rotary controller having low and medium and high positions respectively corresponding to low and medium and high fine temperature bands within any established one of the coarse temperature ranges.

6. In electric heating apparatus including an electric hotplate adapted to support a vessel to be heated, a source of electric power, and a power switch operative between an open position disconnecting said hotplate from said source and a closed position connecting said hotplate to said source: the combination comprising cyclically operative mechanism for operating said power switch between its open and closed positions so that in each cycle of operation of said mechanism said power switch occupies its respective open and closed positions during corresponding first and second time intervals, means including manually adjustable equipment for selectively controlling the cycle of operation of said mechanism in order selectively to set the ratio between the first and second time intervals in each cycle of operation thereof so as correspondingly to set the desired temperature of the vessel supported by said hotplate, a manually operable start device having on and off positions, said start device being operative into its on position to effect energization of said hot plate from said source and to enable said mechanism, and means including a temperature sensing element operatively associated with a vessel supported by said hotplate for initiating operation of said enabled mechanism when the supported vessel is at a relatively high temperature and for arresting operation of said enabled mechanism when the supported vessel is at a relatively low temperature; said equipment comprising a pushbutton controller including a plurality of individual pushbuttons respectively corresponding to a plurality of different temperature ranges and respectively operative to set a corresponding plurality of different ratios between the first and second time intervals in each cycle of operation of said mechanism, and interlock means responsive to operation of any one of the pushbuttons out of its normal position for returning into its normal position the prior last-operated one of the pushbuttons.

7. In electric heating apparatus including an electric hotplate adapted to support a vessel to be heated, a source of electric power, and a power switch operative between an open position disconnecting said hotplate from said source and a closed position connecting said hotplate to said source: the combination comprising cyclically operative mechanism for operating said power switch between its open and closed positions so that in each cycle of operation of said mechanism said power switch occupies its respective open and closed positions during corresponding first and second time intervals, means including manually adjustable equipment for selectively controlling the cycle of operation of said mechanism in order selectively to set the ratio between the first and second time intervals in each cycle of operation thereof so as correspondingly to set the desired temperature of the vessel supported by said hotplate, a manually operable start device having on and off positions, said start device being operative into its on position to effect energization of said hotplate from said source and to enable said mechanism, and means including a temperature sensing element operatively associated with a vessel supported by said hotplate for initiating operation of said enabled mechanism when the supported vessel is at a relatively high temperature and for arresting operation of said enabled mechanism when the supported vessel is at a relatively low temperature; said equipment comprising a pushbutton controller including a plurality of individual pushbuttons respectively corresponding to a plurality of different temperature ranges and respectively operative to set a corresponding plurality of different ratios between the first and second time intervals in each cycle of operation of said mechanism, and interlock means responsive to operation of any one of the pushbuttons out of its normal position for returning into its normal position the prior last-operated one of the pushbuttons, said equipment also comprising a rotary controller including low and medium and high positions respectively corresponding to low and medium and high temperature bands within any one of the temperature ranges and selectively operative into its different positions correspondingly to reset the set ratio between the first and second time intervals in each cycle of operation of said mechanism.

8. In electric heating apparatus including an electric hotplate adapted to support a vessel to be heated, a source of electric power, a power switch operative between an open position disconnecting said hotplate from said power source and a closed position connecting said hotplate to said power source, and a relay provided with a winding and having an operated position actuating said power switch into its closed position and a restored position actuating said power switch into its open position; the combination comprising a control source of voltage, a control element of variable impedance, a control circuit supplied from said control source and including in series relation said winding and said control element, whereby the voltage across said winding is selectively governed by the impedance of said control element, said relay being of the marginal type so that it is operated when an above-critical voltage is impressed across said winding and restored when a below-critical voltage is impressed across said winding, a temperature sensing unit operatively associated with a vessel supported by said hotplate and including a first control resistor having a resistance variable in accordance with the sensed temperature of the supported vessel, a second control resistor, a manually operable control device for selective setting the resistance of said second control resistor, a bridge circuit supplied from said control source and including in series relation said first and second control resistors, whereby the voltage at the junction between said first and second control resistors on said bridge circuit is governed jointly by the resistances of said first and second control resistors, and means governed by the voltage at said junction for selectively varying the impedance of said control element.

9. The electric heating apparatus combination set forth in claim 8, wherein said manually operable control device essentially comprises a pushbutton switch including a plurality of individual pushbuttons respectively corresponding to a plurality of different desired temperatures of the vessel supported by said hotplate and respectively operative to establish a corresponding plurality of different resistances of said second control resistor, and interlock means responsive to operation of any one of the pushbuttons out of its normal position for returning into its normal position the prior last-operated one of the pushbuttons.

10. In electric heating apparatus including an electric hotplate adapted to support a vessel to be heated, a source of electric power, a power switch operative between an open position disconnecting said hotplate from said power source and a closed position connecting said hotplate to said power source, and a relay provided with a winding and having an operated position actuating said power switch into its closed position and a restored position actuating said power switch into its open position; the combination comprising a control source of voltage, a control element of variable impedance, a control circuit supplied from said control source and including in series relation said winding and said control element, whereby the voltage across said winding is selectively governed by the impedance of said control element, said relay being of the marginal type so that it is operated when an above-critical voltage is impressed across said winding and restored when a below-critical voltage is impressed across said winding, a temperature sensing unit operatively associated with a vessel supported by said hotplate and including a first control resistor having a resistance variable in accordance with the sensed temperature of the supported vessel, a second control resistor, means including first and second manually operable control devices for jointly selectively setting the resistance of said second control resistor, said first control device being selectively operative correspondingly to set the coarse resistance of said second control resistor, said second control device being selectively operative correspondingly to set the fine resistance of said second control resistor, a bridge circuit supplied from said control source and including in series relation said first and second control resistors, whereby the voltage at the junction between said first and second control resistors on said bridge circuit is governed jointly by the resistances of said first and second control resistors, and means governed by the voltage at said junction for selectively varying the impedance of said control element.

11. The electric heating apparatus combination set forth in claim 10, wherein said first control device essentially comprises a pushbutton switch including a plurality of individual pushbuttons respectively corresponding to a plurality of different desired temperature ranges of the vessel supported by said hotplate and respectively operative to establish a corresponding plurality of coarse resistances of said second control resistor, and interlock means responsive to operation of any one of the pushbuttons out of its normal position for returning into its normal position the prior last-operated one of the pushbuttons; and wherein said second control device essentially comprises a rotary controller having low and medium and high positions respectively corresponding to desired low and medium and high temperature bands of any desired temperature range of the vessel supported by said hotplate and selectively operative into its low and medium and high positions correspondingly finely to modify the set coarse resistance of said second control resistor.

12. In electric heating apparatus including an electric hotplate adapted to support a vessel to be heated, a source of electric power, a power switch operative between an open position disconnecting said hotplate from said power source and a closed position connecting said hotplate to said power source, and a relay provided with a winding and having an operated position actuating said power switch into its closed position and a restored position actuating said power switch into its open position; the combination comprising an electron discharge tube provided with an anode and a cathode and a control grid, a control circuit supplied from said control source and including in series relation said winding and the anode and the cathode of said tube, whereby the voltage across said winding is selectively governed by the anode-cathode impedance of said tube, said relay being of the marginal type so that it is operated when an above-critical voltage is impressed across said winding and restored when a below-critical voltage is impressed across said winding, a temperature sensing unit operatively associated with a vessel supported by said hotplate and including a first control resistor having a resistance variable in accordance with the sensed temperature of the supported vessel, a second control resistor, a manually operable control device for selectively setting the resistance of said second control resistor, a bridge circuit supplied from said control source and including in series relation said first and second control resistors, whereby the voltage at the junction between said first and second control resistors on said bridge circuit is governed jointly by the resistances of said first and second control resistors, and means governed by the voltage at said junction for applying a corresponding bias to the control grid of said tube.

13. In electric heating apparatus including an electric hotplate adapted to support a vessel to be heated, a source of electric power, a power switch operative between an open position disconnecting said hotplate from said power source and a closed position connecting said hotplate to said power source and a relay provided with a winding and having an operated position actuating said power switch into its closed position and a restored position actuating said power switch into its open position; the combination comprising a control source of voltage, a control element of variable impedance, a control circuit supplied from said control source and including in series relation said winding and said control element, whereby the voltage across said winding is selectively governed by the impedance of said control element, said relay being of the marginal type so that it is operated when an above-critical voltage is impressed across said winding and restored when a below-critical voltage is impressed across said winding, a capacitor bridged across said winding, an auxiliary resistor, means responsive to operation of said relay for connecting said auxiliary resistor to said control circuit and responsive to restoration of said relay for disconnecting said auxiliary resistor from said control circuit, said auxiliary resistor being connected in said control circuit in series relation with said winding and said control element so as to reduce the voltage across said winding, a temperature sensing unit operatively associated with a vessel supported by said hotplate and including a first control resistor having a resistance variable in accordance with the sensed temperature of the supported vessel, a second control resistor, a manually operable control device for selectively setting the resistance of said second control resistor, a bridge circuit supplied from said control source and including in series relation said first and second control resistors, whereby the voltage at the junction between said first and second control resistors on said bridge circuit is governed jointly by the resistances of said first and second control resistors, and means governed by the voltage at said junction for selectively varying the impedance of said control element.

14. In electric heating apparatus including an electric hotplate adapted to support a vessel to be heated, a source of electric power, a power switch operative between an open position disconnecting said hotplate from said power source and a closed position connecting said hotplate to said power source, and a relay provided with a winding and having an operated position actuating said power switch into its closed position and a restored position actuating said power switch into its open position; the combination comprising a control source of voltage, a load resistor, a control element of variable impedance, a control circuit supplied from said control source and including in series relation said winding and said load resistor and said control element, whereby the voltage across said winding is selectively governed by the impedance of said control element, said relay being of the marginal type so that it is operated when an above-critical voltage is impressed across said winding and restored when a below-critical voltage is impressed across said winding, a capacitor bridged across said winding, first and second auxiliary resistors, means responsive to operation of said relay for connecting said first and second auxiliary resistors to said control circuit and responsive to restoration of said relay for disconnecting said first and second auxiliary resistors from said control circuit, said first auxiliary resistor being connected to said control circuit in series relation with said winding and said load resistor and said control element so as to reduce the voltage across said winding, said second auxiliary being connected to said control circuit in parallel relation with said winding and said first auxiliary resistor so as to maintain substantially fixed the overall impedance of the section of said control circuit disposed between said load resistor and said control element, a temperature sensing unit operatively associated with a vessel supported by said hotplate and including a first control resistor having a resistance variable in accordance with the sensed temperature of the supported vessel, a second control resistor, a manually operable control device for selectively setting the resistance of said second control resistor, a bridge circuit supplied from said control source and including in series relation said first and second control resistors, whereby the voltage at the junction between said first and second control resistors on said bridge circuit is governed jointly by the resistances of said first and second control resistors, and means governed by the voltage at said junction for selectively varying the impedance of said control element.

15. In electric heating apparatus including an electric hotplate adapted to support a vessel to be heated, a source of electric power, a power switch operative between an open position disconnecting said hotplate from said power source and a closed position connecting said hotplate to said power source, and a relay provided with a winding and having an operated position actuating said power switch into its closed position and a restored position actuating said power switch into its open position; the combination comprising a control source of voltage, a load resistor, a control element of variable impedance, a control circuit supplied from said control source and including in series relation said winding and said load resistor and said control element, whereby the voltage across said winding is selectively governed by the impedance of said control element, said relay being of the marginal type so that it is operated when an above-critical voltage is impressed across said winding and restored when a below-critical voltage is impressed across said winding, an auxiliary resistor, means responsive to operation of said relay for connecting said auxiliary resistor to said control circuit and responsive to restoration of said relay for disconnecting said auxiliary resistor from said control circuit, said auxiliary resistor being connected to said control circuit in series relation with said winding and said load resistor and said control element so as to reduce the voltage across said winding, a capacitor bridged across said winding, said capacitor being alternately discharged through said winding and charged through said load resistor and said control element in response to alternate operation and restoration of said relay when the impedance of said control element is such that the voltage across said winding is substantially at the critical voltage, whereby the discharge time interval of said capacitor and consequently the time interval during which said relay is retained in its operated position is substantially fixed and the charge time interval of said capacitor and consequently the time interval during which said relay is retained in its restored position is variable and dependent upon the impedance of said control element when the voltage across said winding is substantially at the critical voltage, a temperature sensing unit operatively associated with a vessel supported by said hotplate and including a first control resistor having a resistance variable in accordance with the sensed temperature of the supported vessel, a second control resistor, a manually operable control device for selectively setting the resistance of said second control resistor, a bridge circuit supplied from said control source and including in series relation said first and second control resistors, whereby the voltage at the junction between said first and second control resistors on said bridge circuit is governed jointly by the resistances of said first and second control resistors, and means governed by the voltage at said junction for selectively varying the impedance of said control element, whereby the position of said manually operable control device ultimately establishes the impedance of said control element at which the voltage across said winding is substantially at the critical value and consequently the time interval during which said relay is retained in its restored position so that the position of said manually operable control device ultimately establishes the ratio between the closed time interval and the open time interval of said power switch and the resulting desired temperature of the vessel supported by said hotplate.

References Cited in the file of this patent

UNITED STATES PATENTS

| | | |
|---|---|---|
| 2,236,624 | Littwin | Apr. 1, 1941 |
| 2,431,904 | Andrews | Dec. 2, 1947 |
| 2,686,250 | Schroeder | Aug. 10, 1954 |
| 2,727,974 | Simmons | Dec. 20, 1955 |
| 2,727,975 | Molyneaux et al. | Dec. 20, 1955 |